United States Patent
Biro et al.

(10) Patent No.: US 7,710,966 B1
(45) Date of Patent: May 4, 2010

(54) DISTRIBUTING PACKETS MORE EVENLY OVER TRUNKED NETWORK LINKS

(75) Inventors: Ross Biro, Ashburn, VA (US); Stephen Stuart, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 876 days.

(21) Appl. No.: 11/185,203

(22) Filed: Jul. 19, 2005

(51) Int. Cl.
*H04L 12/56* (2006.01)
(52) U.S. Cl. ............... 370/392; 370/230.1; 370/235
(58) Field of Classification Search ............... 370/437, 370/351, 389, 230.1, 231, 235, 229, 392, 370/396, 408, 446
See application file for complete search history.

(56) References Cited

U.S. PATENT DOCUMENTS

| | | | | |
|---|---|---|---|---|
| 5,386,414 A * | 1/1995 | Chou et al. | ................ | 370/389 |
| 5,912,877 A * | 6/1999 | Shirai et al. | ................ | 370/228 |
| 5,937,169 A * | 8/1999 | Connery et al. | ............. | 709/250 |
| 6,373,986 B1 * | 4/2002 | Fink | ........................... | 382/232 |
| 6,952,396 B1 * | 10/2005 | Cottreau et al. | ............. | 370/222 |
| 6,990,075 B2 * | 1/2006 | Krishnamurthy et al. | .... | 370/236 |
| 7,099,276 B1 * | 8/2006 | Kalkunte et al. | ......... | 370/230.1 |
| 2002/0163889 A1 * | 11/2002 | Yemini et al. | ............... | 370/238 |
| 2004/0039839 A1 * | 2/2004 | Kalyanaraman et al. | .... | 709/238 |
| 2004/0156345 A1 * | 8/2004 | Steer et al. | .................. | 370/338 |
| 2005/0030948 A1 * | 2/2005 | Wyatt | ......................... | 370/392 |
| 2006/0080446 A1 * | 4/2006 | Bahl | ......................... | 709/227 |

OTHER PUBLICATIONS

Information Sciences Institute of Univ. of Southern California, "Internet Protocol, DARPA Internet Program Protocol Specification," Sep. 1981, pp. 1-45.
Information Sciences Institute of Univ. of Southern California, "Transmission Control Protocol, DARPA Internet Program Protocol Specification," Sep. 1981, pp. 1-85.

* cited by examiner

*Primary Examiner*—Kwang B Yao
*Assistant Examiner*—Kenan Cehic
(74) *Attorney, Agent, or Firm*—Sterne, Kessler, Goldstein & Fox PLLC

(57) ABSTRACT

Routing nodes in communications networks use policies and certain fields, called selection fields, in packet headers to make routing decisions. When routing over a trunk, a specific trunked link over which to forward a packet must be selected. Policies and selection fields can be used in a way that causes the packets in data streams to be distributed more evenly across the trunked links than is currently done.

19 Claims, 4 Drawing Sheets

DISTRIBUTING PACKETS MORE EVENLY OVER TRUNKED NETWORK LINKS

TECHNICAL FIELD

Embodiments relate to the field of communications networks and computer networks. Embodiments also relate to distributing packets over trunked network links so that no one link in the trunk is substantially more or substantially less utilized than any other link.

BACKGROUND

Communications networks enable people and machines to communicate. Each person or machine connected to the network is a network element. Some network elements are routing nodes. A routing node is a network element that forwards information. Forwarding means receiving information that is intended for another network element and sending that information toward that other network element. Other network elements are end points. An end point is a network element that can send information or receive information, but can not forward information.

Early communications networks, such as the early telephone networks, were connection based. In connection based networks, two endpoints were electrically connected by way of switch boards and, later, electrical switches. Modern communications networks are primarily packet based. In a packet based network, information is packaged into digital packets and routed between endpoints. Routing is a process by which a packet is passed from one routing node to another until it can be passed to its destination. A routing node can also send or receive packets from other network elements.

A data stream is information being transmitted over time from one network element to another. Packet networks must often break a data stream into a series of packets. One reason for packetizing a data stream is that the data stream contains more data than a single packet can hold. Another reason is that the endpoints need to receive data quickly after the data is generated. An example is two people having a phone conversation. If only single packets were used, one person would begin talking and continue talking until exhausting their side of the conversation, then the recorded soliloquy would be sent to the other person. Many short packets are used instead so the listener can hear the speaker nearly instantaneously.

The packets carried by a packet network have many different parts, called fields. The technical specification describing the fields and how to assemble them into a packet is called a network protocol. Those skilled in the art of communications network utilize many different network protocols. One common protocol is the Internet Protocol (IP) defined by Request for Comment (RFC) 791 of the Internet Engineering Task Force (IETF). Another popular protocol is the Transmission Control Protocol (TCP) defined by IETF RFC 793. Those skilled in the art of communications networks are familiar with the IETF and the RFCs because they regulate and define the structure and technological basis for the Internet.

IP and TCP packets have two main sections, the header and the payload. The payload is the data that is being transmitted. The header is data intended for use by the network itself. Header structures are defined by the RFCs and contain specific fields.

IP packets have IP headers as defined by IETF RFC 791. Some of the fields in an IP packet header are source address, destination address, time to live and header checksum. Some optional fields are security, and timestamp. Every network element in an IP network has at least one address. The source address is the address of the network element that sent the packet. Similarly, the destination address is the address of the network element that should receive the packet.

TCP packets have TCP headers as defined by IETF RFC 793. Some of the fields in a TCP packet header are TCP checksum, urgent pointer, sequence number, maximum segment size (MSS), and the urgent bit (URG). TCP packets are often carried inside IP packets. Such packets are often called TCP/IP packets. The IP packet's payload is the TCP packet. A TCP/IP packet has an IP header and a TCP header. Just as TCP and IP can be combined, many protocols can be combined into a protocol stack. Every protocol has its own header. The number of protocols that can be theoretically combined is limitless, but usually less than 6 can be combined practically.

TCP is a connection oriented protocol. A TCP connection is established when one network element requests a TCP connection from a second network element and the second network element agrees. Either network element can then send a data stream through the TCP connection to the other network element.

When a TCP connection is established, the two network elements negotiate to reach an agreement on certain connection properties. One of those properties is the MSS. The MSS is the greatest amount of data that a network element can put in any one packet. To transmit a 10000 byte data stream from a source to a destination with a 500 byte MSS the source can packetize the data into 20 packets containing 500 bytes of data. Each of the 20 packets has a sequence number. For example, the first packet can have a sequence number of 0, the second a sequence number of 500, and the $20^{th}$ a sequence number of 9500. The destination can use the sequence numbers to reassemble the data stream.

The network elements in a packet network are connected by links. Different technologies use different types of links. Radio links use radio waves through the air. Fiber optic links use long glass fibers. A link carries packets between two directly linked network elements. Indirectly linked network elements can send packets to one another, but the packets must traverse two or more links. Some links have higher capacity than other links, meaning they can carry information at a higher rate. One way to increase capacity is to trunk, or combine, two slower links. A trunk is a link that consists of trunked links.

Packets must often traverse a number of routing nodes when traveling from end point to end point. A routing node has more than one link. It receives a packet on one link and must make a routing decision by selecting which link to forward the packet onto. Routing nodes can use policies to make routing decisions. A policy instructs the routing node to examine various data and make a decision based on that data. One important datum that can be used is which link the packet arrived on. Data can also be obtained from any header field in the packet.

Trunks cause an interesting routing problem. All the trunked links go between the same two network elements. Which one should carry a packet? The solution is to use a load balancing policy to try to ensure that all the trunked links have similar utilization. Utilization is a networking term for the percentage of capacity being used. The current solution is to choose a trunked link based on a hash of the source address and destination address. A hash is a mathematical function that, given an input, produces a seemingly random result. As such, the current solution passes all the packets in a data stream, which go from one particular network element to another, on the same trunked link, even when the other trunked links are completely idle. As such, the trunk links have very dissimilar utilization and the rate at which information traverses the trunk is virtually limited to the capacity of one trunked link.

Based on the foregoing it can be appreciated that in order to overcome the shortcomings of the current methods and systems a need exists for an improved method and system for distributing packets more evenly over a trunk.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore one aspect of the embodiments to overcome the shortcomings in current technology by setting a policy within a network element that selects a trunked link from a trunk for every packet. The packet can be part of a data stream or otherwise part of the normal flow of packets through the trunk. As discussed above, every packet has at least one header and every header has at least one field. Therefore, the packet has at least one field. At least one field from among all the fields in a packet is a selection field. The policy uses the selection field, or selection fields if there are more than one, as well as other data to select the trunked link.

An aspect of certain embodiments is producing packets and setting the selection fields within the packet headers so that the policy changes the trunked link selected for each packet in a deterministic manner, meaning a predictable or non-random manner. The packets can be sent to the network element which then forwards each packet along the trunked link that was selected for that particular packet.

The time to live field, security field, and timestamp field are examples of Internet Protocol (IP) packet header fields that can be used as selection fields leading to a deterministic trunked link selection.

The urgent field is an example of a TCP packet header field that can be used as selection fields leading to a deterministic trunked link selection.

A further aspect of certain embodiments is to use fields and properties of the TCP protocol. If a trunk has N trunked links with N an integer greater than one, then the maximum segment size is set to a number that is relatively prime to N. The MSS is relatively prime to N if the greatest common divisor of N and the MSS is 1. The policy is set to select a trunked link based on the sequence number modulo N.

An aspect of alternative embodiments is producing packets and setting the selection fields within the packet headers so that the policy changes the trunked link selected for each packet in a random manner. The packets can be sent to the network element which then forwards each packet along the trunked link that was selected for that particular packet.

The header checksum of an IP packet and the TCP checksum of a TCP packet can be used as selection fields leading to a random trunked link selection.

As discussed above, a packet can contain many headers with different headers defined by different protocols. A load balancing protocol can be defined having a load balancing header containing at least one field that guides packet routing over trunks. The load balancing header can be added to a packets protocol stack.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

Routing nodes in communications networks use policies and certain fields, called selection fields, in packet headers to make routing decisions. When routing over a trunk, a specific trunked link over which to forward a packet must be selected. Policies and selection fields can be used in a way that causes the packets in data streams to be distributed more evenly across the trunked links than is currently done.

Architectural Overview

Figure 1:
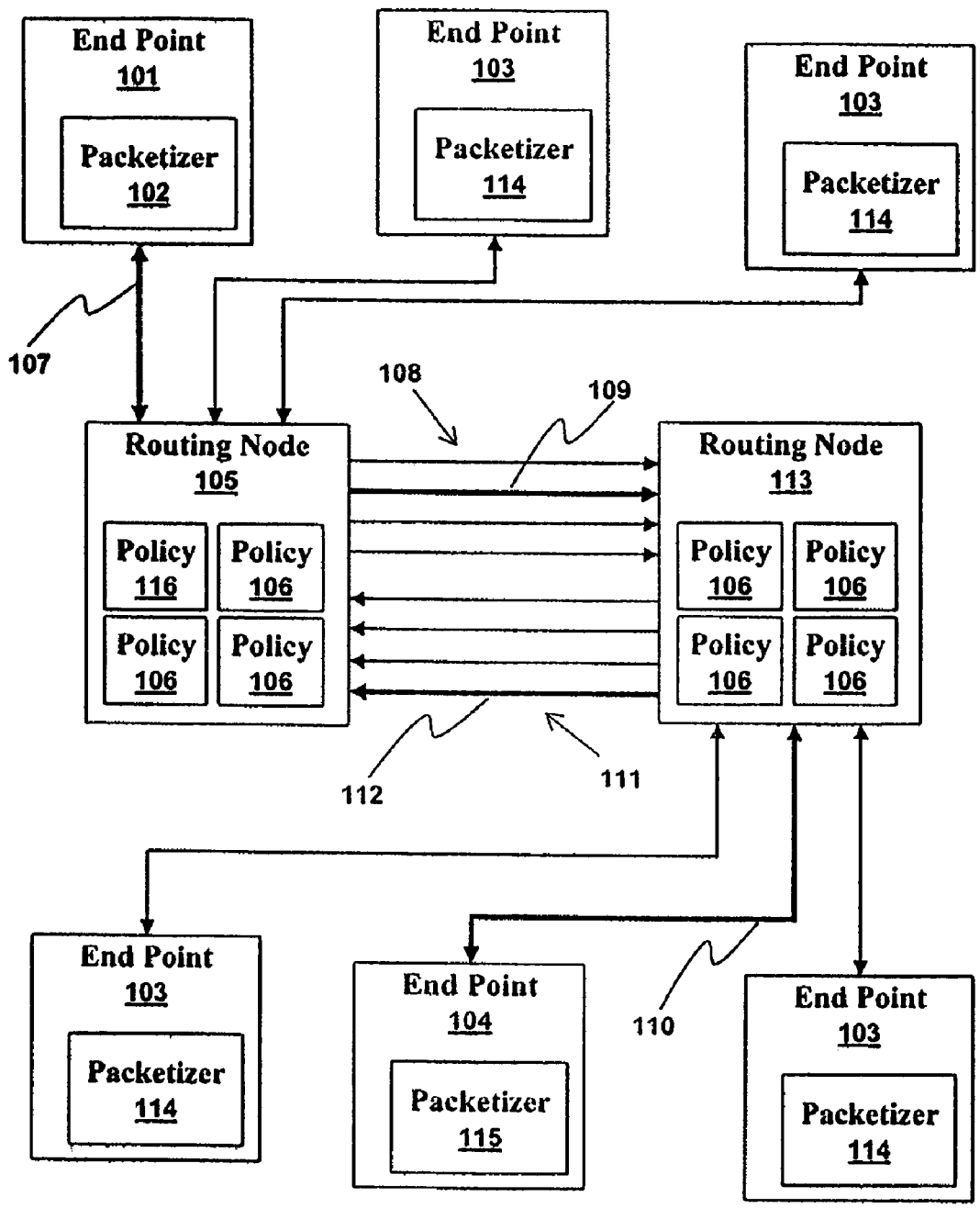
FIG. 1 illustrates a network with trunks in accordance with an aspect of the embodiments.

FIG. 1 illustrates a network with trunks 108, 111 in accordance with an aspect of the embodiments. A first end point 101 containing a packetizer 102 sends a data stream to a second end point 104 that also contains a packetizer 115. The packetizer 102 divides the data stream into data packets and sends them along a link 107 to a routing node 105. The routing node 105 can forward the packets along a trunk 108 to another routing node 113. To forward the packet along the trunk, however, the routing node 105 must select a trunked link 109 that is part of the trunk 108. As illustrated, the routing node 105 selects trunked link 109 based on a policy 116. Another routing node 113 can receive the packet and forward it along a link 110 to the second end point 104. The packetizer 115 in the second end point 104 reassembles the packets to obtain the data stream.

Most end points 103 have packetizers 114 that do not intentionally adjust data packets for the purpose of balancing a load across a trunk. Packetizers 114 always place values in data packet header fields that routing nodes use to decide along which outgoing link to forward the packet. For example, a data packet always contains a value indicating the data packet's destination. Routing nodes use the values stored in header fields and use policies 106 to decide on what link to forward the data packet.

A packetizer 102 and a policy 116 can interact in a manner that distributes the data packets of a data stream among the links in a trunk. For example, first end point 101 can open a TCP connection to second end point 104. Policy 116 can be set to select a link from a trunk 108 based on the TCP sequence number. Packetizer 102 can have a maximum segment size (MSS) that is relatively prime to the number of links in the trunk 108. A MSS of 1001 meets this criterion for trunk 108 containing four links.

Figure 2:
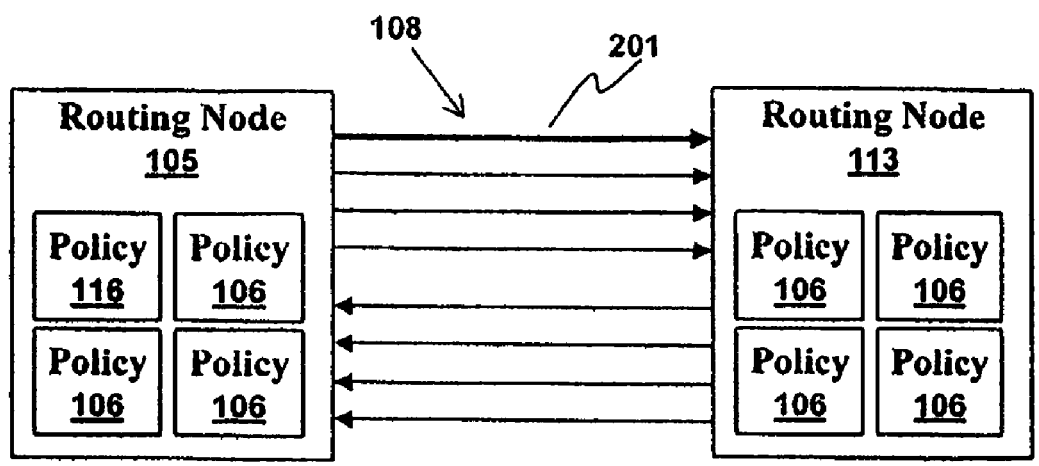
FIG. 2 illustrates a path in a trunk of the first data packet of a data stream in accordance with an embodiment.

FIG. 2 illustrates the path in a trunk 108 of the first data packet of a data stream in accordance with an embodiment. The TCP sequence number for the first packet traversing a TCP connection can be set to any number. For this example, the TCP sequence number is set to zero and the number of bytes being transmitted is over 10000. The routing node 105 uses a policy 116 that selects a trunked link 201 based on the sequence number modulo the number of links, which is four. Zero modulo four is zero. The trunked links are numbered zero through three. Linked trunk number zero 201 is selected for the first packet.

Figure 3:
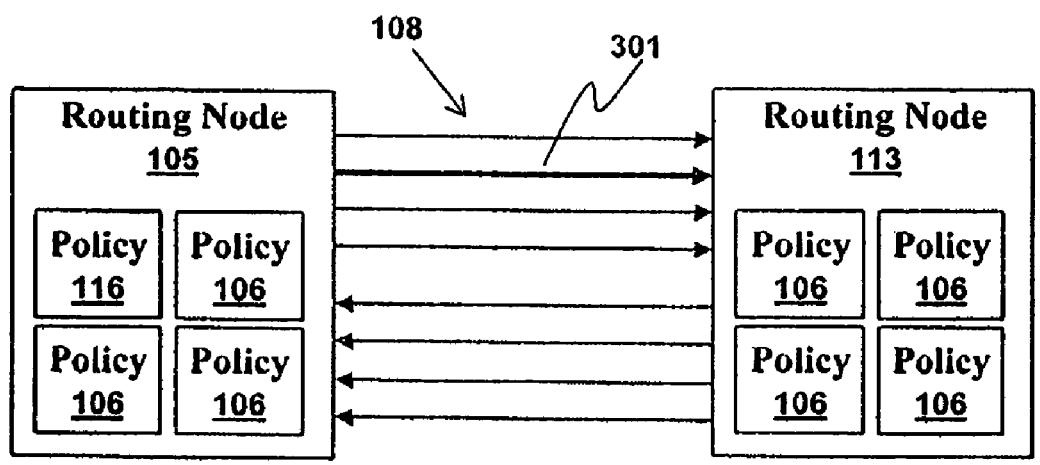
FIG. 3 illustrates a path in a trunk of the second data packet of a data stream in accordance with an embodiment.

FIG. 3 illustrates the path in a trunk of the second data packet of a data stream in accordance with an embodiment. The MSS is still 1001 because it does not change for the TCP connection. The sequence number of the second packet is 1001 because the first packet contains 1001 bytes and has a sequence number of zero. 1001 modulo four is one. Trunked link number one 301 is selected for the second packet.

Figure 4:
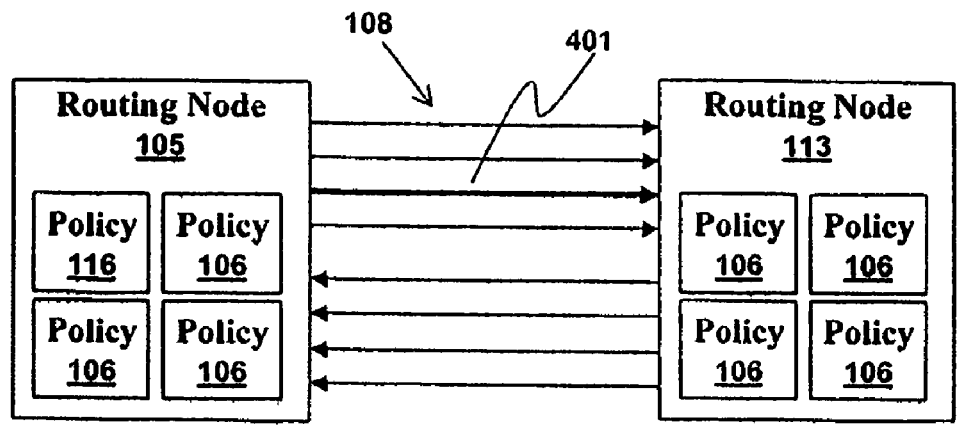
FIG. 4 illustrates a path in a trunk of the third data packet of a data stream in accordance with an embodiment.

FIG. 4 illustrates the path in a trunk of the third data packet of a data stream in accordance with an embodiment. The sequence number of the third packet is 2002 because the second packet contains 1001 bytes and has a sequence number of 1001. 2002 modulo four is two. Trunked link number two 401 is selected for the third packet.

Figure 5:
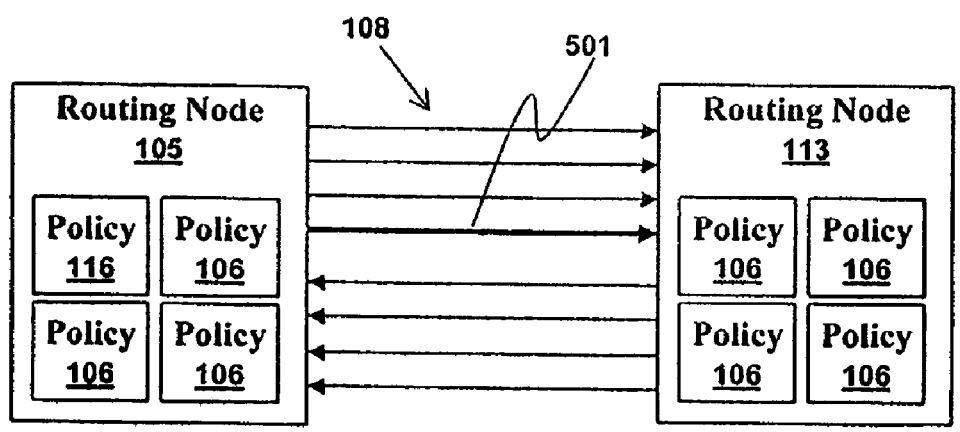
FIG. 5 illustrates a path in a trunk of the fourth data packet of a data stream in accordance with an embodiment.

FIG. 5 illustrates the path in a trunk of the fourth data packet of a data stream in accordance with an embodiment. The sequence number of the fourth packet is 3003 because the third packet contains 1001 bytes and has a sequence number of 2002. 3003 modulo four is three. Trunked link number three 501 is selected for the fourth packet.

High Level Process Flow

Figure 6:
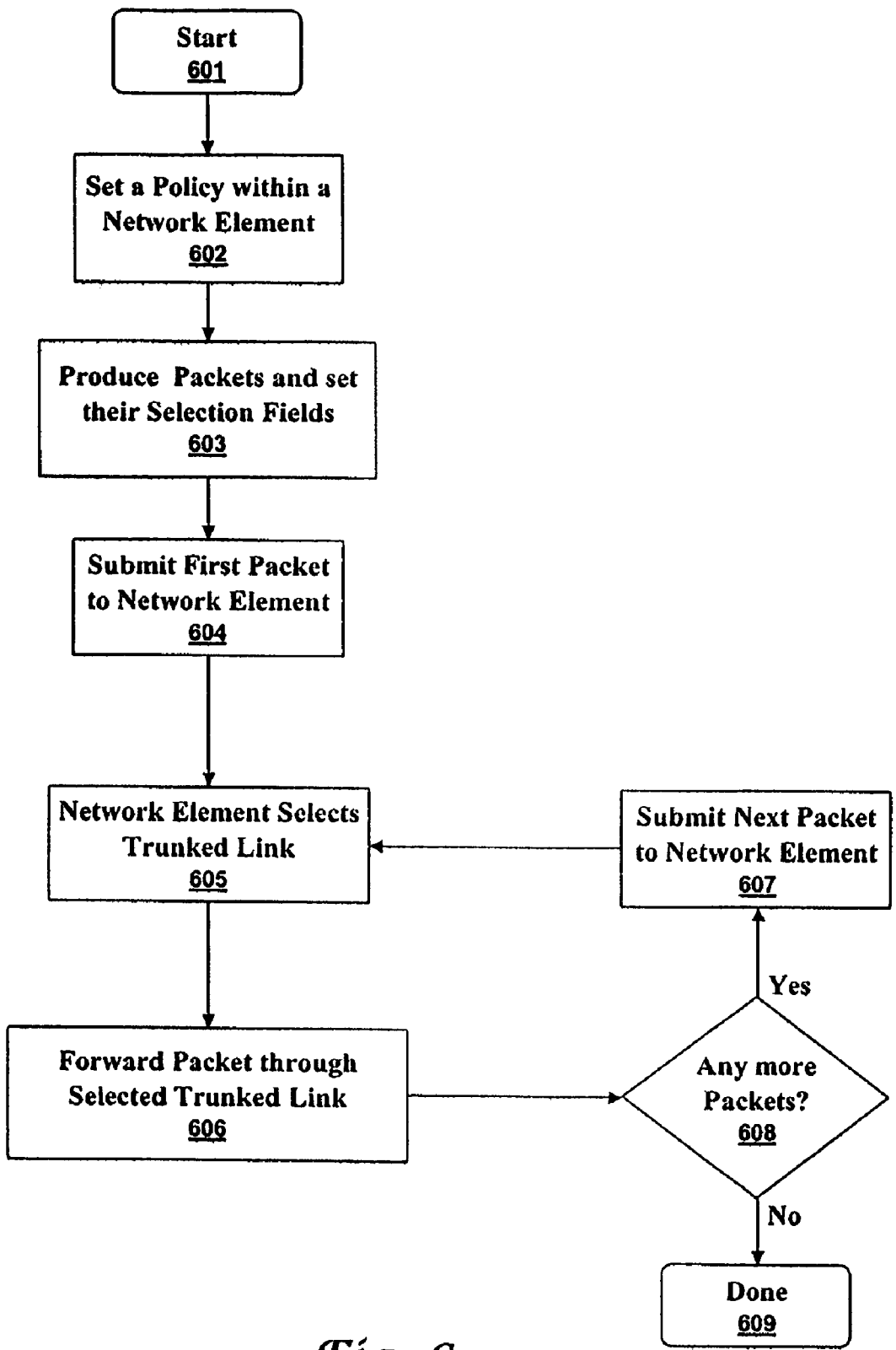
FIG. 6 illustrates a high level flow diagram in accordance with an embodiment.

FIG. 6 illustrates a high level flow diagram in accordance with an embodiment. After the start 601 a policy is set within a network element 602. The network element under consideration can forward packets along a trunk. As discussed above, packets can contain many headers and the headers can contain many fields. One or more of the fields are selection fields. In the earlier example, the TCP sequence number is used as a selection field. The policy informs the network element to use a packet's selection field values to select a trunked link along which to forward the packet.

Packets are produced and their selection fields are set 603. In some cases, such as using the TCP sequence number or a checksum value as a selection field, the selection field value must be set to a particular value. In other cases, the selection value can be varied. For example, the time to live value can be set to any value between 4 and 7. A policy using the time to live modulo 4 to select among four trunked links could be guided by choosing different values for the time to live field. The time to live value is usually reduced by one every time a packet transits a routing node.

The first packet is submitted to the network element 604. The network element selects a trunked link 605 from the trunk based on the policy and the selection field or fields and then forwards the packet through the selected trunked link 606. If there are any more packets 608, the next packet is submitted to the network element 607 and the process loops back to selecting a trunked link 605. Otherwise, the last packet has been sent and the process is done 609.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment" or "one embodiment" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
    setting a policy within a network element that selects a trunked link from a trunk comprising N trunked links with N an integer greater than 1 for each one of a multiplicity of packets wherein each packet comprises at least one header and at least one selection field in the at least one header and wherein the trunked link selected for each packet is based in part on a value in the at least one selection field modulo N;
    producing the multiplicity of packets and setting the at least one selection field within each of the packets based upon a value relatively prime to N such that the trunked link selected by the policy changes in a deterministic manner; and
    submitting the multiplicity of packets to the network element, whereby the network element can then send each packet through the trunked link selected for that respective packet.

2. The method of claim 1 wherein each packet is an IP packet and the at least one header comprises an IP header.

3. The method of claim 2 wherein the at least one selection field comprises a time to live field.

4. The method of claim 2 wherein the at least one selection field comprises a security field.

5. The method of claim 2 wherein the at least one selection field comprises a timestamp field.

6. The method of claim 1 wherein each packet is a TCP packet and the at least one header comprises a TCP header.

7. The method of claim 6 wherein the at least one selection field is a TCP sequence number and further comprising setting a maximum segment size of an end station to be relatively prime to N wherein N is the number of trunked links in the trunk, and using the TCP sequence number modulo N to select the trunked link.

8. The method of claim 6 wherein the at least one selection field comprises a TCP urgent field and further comprising setting an URG bit of the TCP urgent field to zero.

9. The method of claim 1 wherein the at least one header comprises a load balancing header.

10. A system comprising:
at least two network elements comprising two end stations and zero or more routing nodes;
at least one link joining the network elements into a communications network wherein at least one of the at least one link is a trunk comprising N trunked links with N an integer greater than 1; and
at least one routing policy contained in at least one of the at least two network elements wherein the at least one routing policy is used to select one of the N trunked links for a packet based on at least one selection field in the header of the packet modulo N and wherein the at least one routing policy is used to set the at least one selection field within the packet header based upon a value relatively prime to N such that the trunked link selected by the policy changes in a deterministic manner.

11. The system of claim 10 wherein the packet is an IP packet.

12. The system of claim 10 wherein the packet is a TCP packet.

13. The system of claim 12 wherein the at least one selection field is a TCP sequence number, the at least one routing policy is used to select one of the N trunked links based on the TCP sequence number modulo N and set a maximum segment size of an end station to be relatively prime to N.

14. The system of claim 11 wherein the at least one selection field comprises a time to live field.

15. A system comprising:
a means of keeping state information in at least one field within at least one header within every network packet within a network packet stream;
a means of selecting an aggregation member from an aggregated link comprising N aggregated members with N an integer greater than 1 based on the value of the state information modulo N;
a means of setting the state information in the at least one field within the at least one header to be a number relatively prime to N such that the aggregation member selected by the selecting means changes in a deterministic manner; and
a means of sending each network packet to the aggregation member selected for it.

16. A method comprising:
setting a policy within a network element that selects a trunked link for each one of a multiplicity of packets from a trunk comprising N trunked links with N an integer greater than 1, wherein each of the packets comprises at least one header comprising at least one selection field;
causing the at least one selection field in each one of the multiplicity of packets to be set to a number relatively prime to N; and
selecting a trunked link with the network element for each packet based upon a value in the at least one selection field modulo N.

17. A system comprising:
a network element configured to select at least one link of a trunk comprising N trunked links with N an integer greater than 1, wherein the network element is configured to process a packet having at least one header including at least one selection field;
at least one routing policy contained in the network element wherein the at least one routing policy is used by the network element to select one of the trunked links for the packet based upon a value in the at least one selection field modulo N; and
at least one packetizer configured to cause the at least one selection field in the header of each of the multiplicity of packets to be set to a number relatively prime to N.

18. The method of claim 16 wherein the setting further comprises setting the maximum segment size (MSS) in each of the multiplicity of packets to be relatively prime to N, wherein the at least one selection field in each of the multiplicity of packets upon arrival at the network element is a TCP sequence number having a value which is a multiple of the MSS.

19. The system of claim 17 wherein the packetizer is further configured to set the maximum segment size (MSS) in each of the multiplicity of packets to be relatively prime to N, wherein the at least one selection field in each of the multiplicity of packets upon arrival at the network element is a TCP sequence number having a value which is a multiple of the MSS.

* * * * *